E. V. SWANGREN.
CAN HEAD CUTTING AND FORMING AND FLANGE CURLING MACHINE.
APPLICATION FILED OCT. 20, 1909.
984,169.
Patented Feb. 14, 1911.
4 SHEETS—SHEET 2.
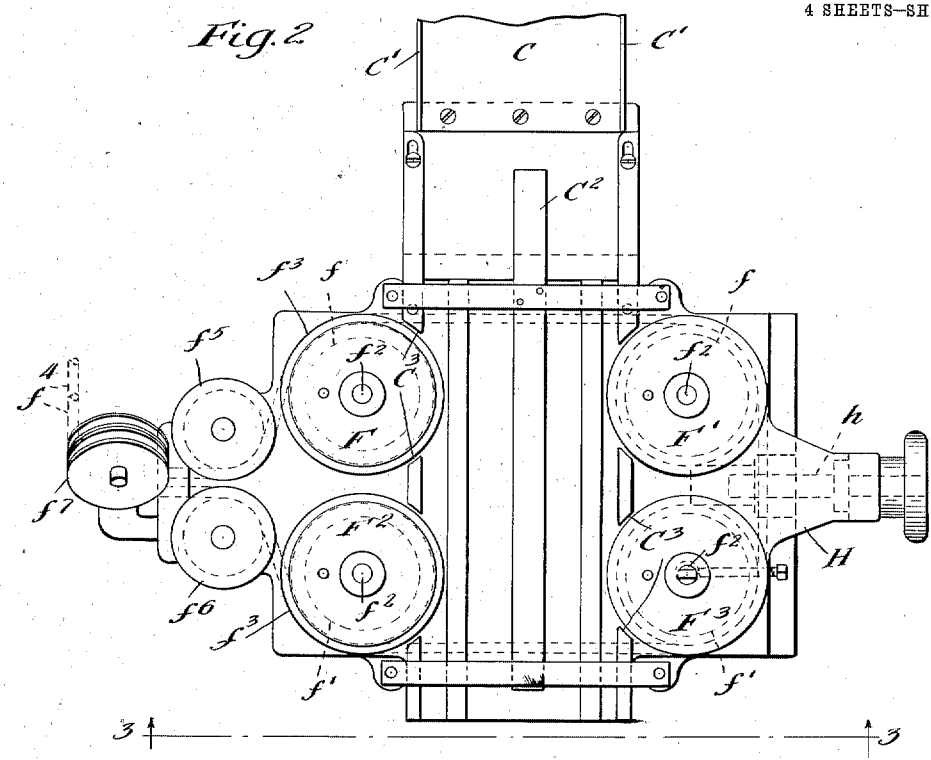
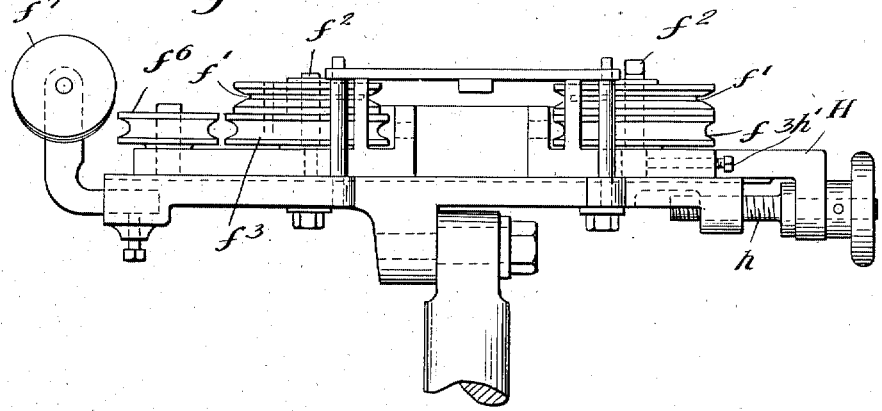

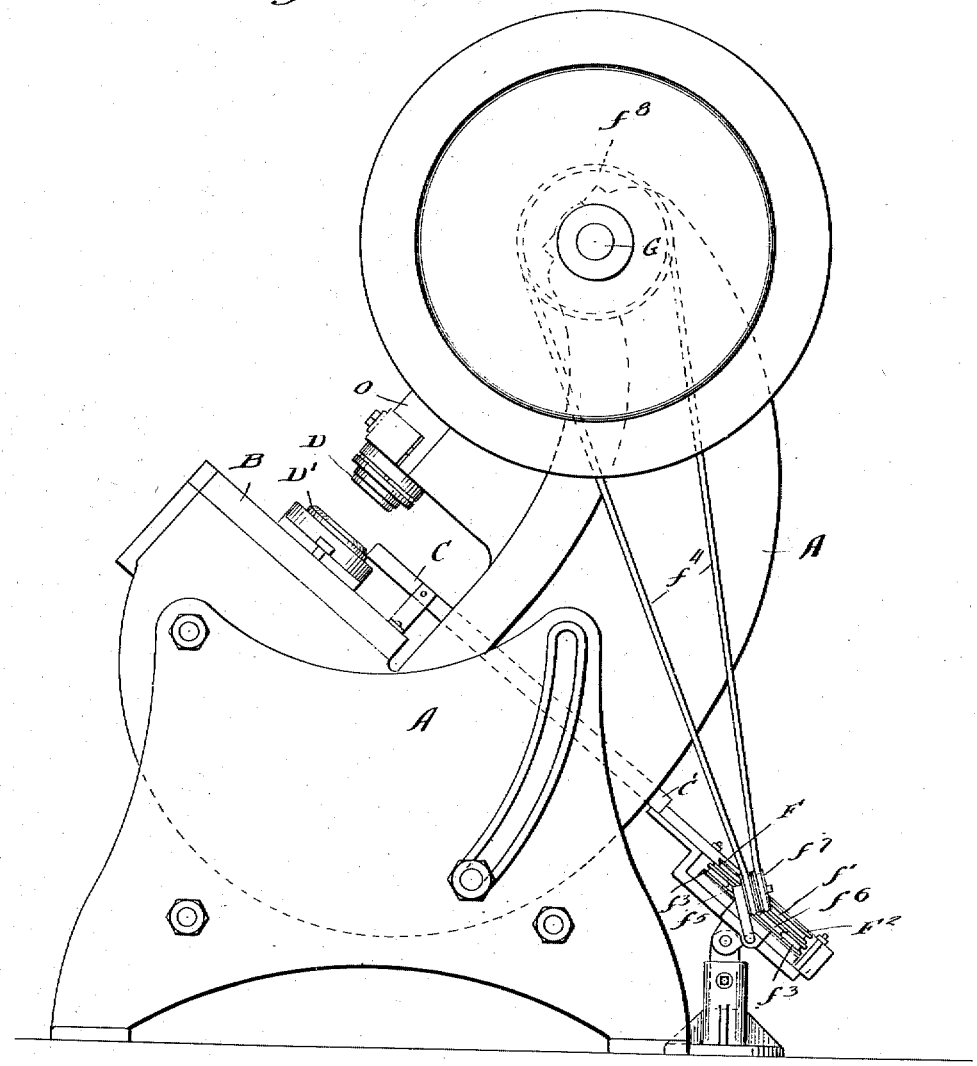

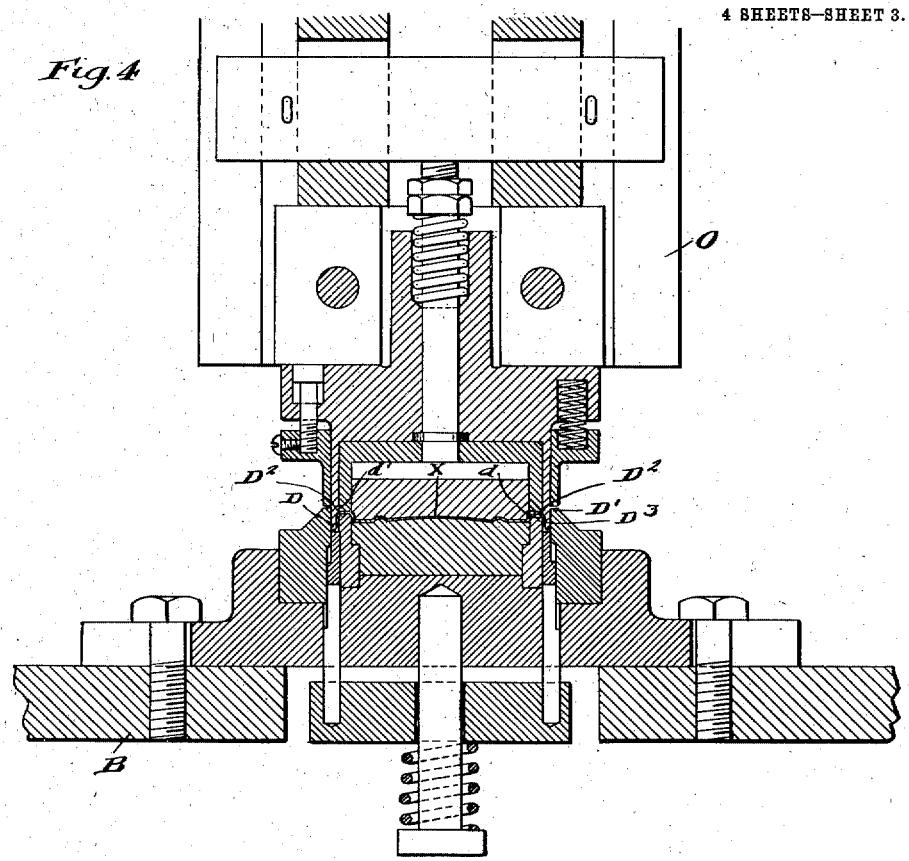

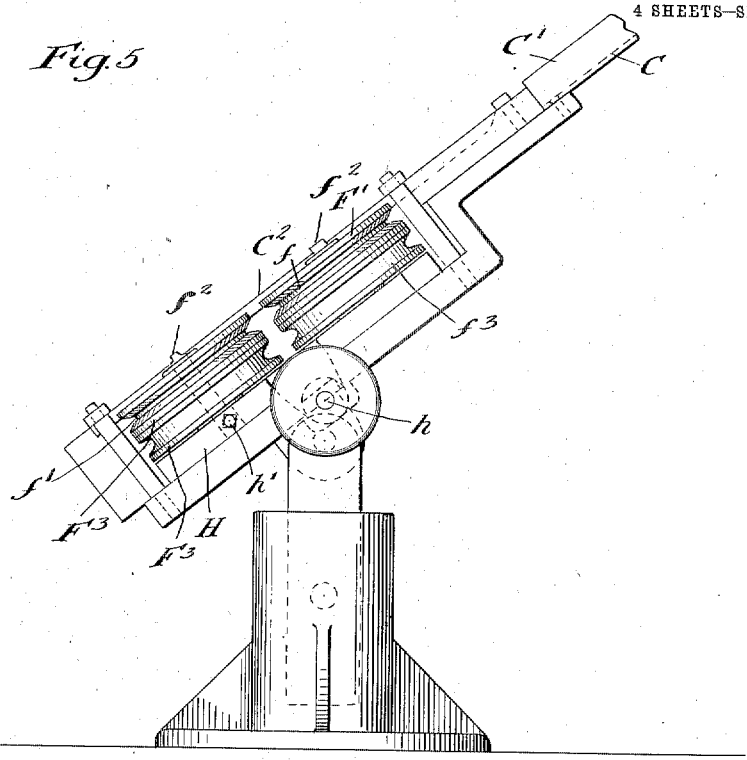
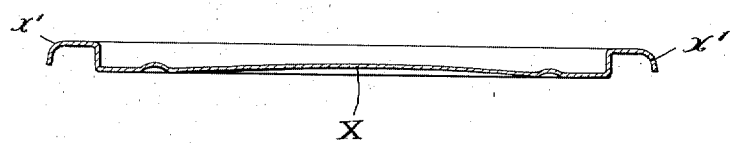
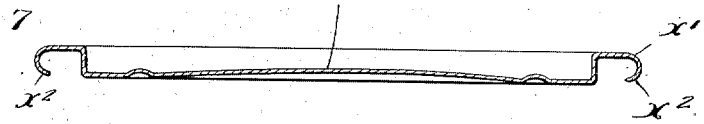

ary start or curve $x^1$, this preliminary start
UNITED STATES PATENT OFFICE.

EDWIN V. SWANGREN, OF MAYWOOD, ILLINOIS, ASSIGNOR TO AMERICAN CAN COMPANY, OF NEW YORK, N. Y., A CORPORATION OF NEW JERSEY.

CAN-HEAD CUTTING AND FORMING AND FLANGE-CURLING MACHINE.

984,169. Specification of Letters Patent. Patented Feb. 14, 1911.

Application filed October 20, 1909. Serial No. 523,600.

*To all whom it may concern:*

Be it known that I, EDWIN V. SWANGREN, a citizen of the United States, residing in Maywood, in the county of Cook and State of Illinois, have invented a new and useful Improvement in Can-Head Cutting and Forming and Flange-Curling Machines, of which the following is a specification.

My invention relates to the manufacture of can heads or covers, the flanges of which are curled to form an annular channel to receive a liquid cement or packing preparatory to double seaming the heads or covers on the can bodies.

Heretofore in the manufacture of can heads with curled flanges, the can heads have been first cut and formed in a press with suitable dies, the cutting and forming press discharging them into a basket or other suitable receptacle, and then the cut and formed can heads are fed into a separate machine which operates to curl or curve the edge of the straight flange inward, and thus form a channel to receive the cement or packing. And as the can heads tend to nest and stick together, and as the flanges of the heads have sharp cut edges, it is a matter of considerable labor and difficulty and expense to separate and arrange the can heads for feeding one by one into the flange curling machine.

The object of my invention is to provide a combined can head cutting and forming press and curling device which will operate to both automatically cut and form the can head and curl its flange as the can heads are delivered or discharged one by one from the cutting and forming dies.

To practically accomplish this object or result, and herein my invention consists, I provide the cutting and flange forming dies of the cutting and forming press with provisions for slightly starting or curving the can head flange and combine with the discharge chute of the press flange curling devices between which the can head passes as it is discharged from the press and by which the already started or slightly curved flange of each can head is curled or curved into the required shape as the can head passes between the curling devices.

The curling devices may be of any suitable kind or construction adapted to perform the flange curling function. I however prefer to employ for this purpose curling devices having grooved and convex faces instead of concave faces, and I prefer that the curling devices between which the can heads pass should both be rotary ones, or in the form of rotatable flange curling disks, and I prefer to employ two pair of curling disks between which each can head passes successively, the latter pair being set slightly closer together than the first pair, and I prefer that the first pair of curling disks or rollers should be furnished with flat grooves or operating faces, while the latter pair should have curved grooves or operating faces, and thus serve to give the finished shape to the curl of the can head flange. One of the rolls or disks of each pair is preferably made of larger diameter than the other one to cause the rolls to have a slight slipping action upon the can head rotating between them, and thus render the curling operation more efficient.

My invention also consists in the novel construction of parts and devices and in the novel combinations of parts and devices herein shown and described and more particularly specified in the claims.

In the accompanying drawing forming a part of this specification, Figure 1 is a side elevation of a can head cutting, forming and flange curling machine embodying my invention. Fig. 2 is a detail plan view of the flange curling mechanism. Fig. 3 is an end view of the flange curling mechanism looking from line 3—3 of Fig. 2. Fig. 4 is a detail section through the can head cutting and flange forming dies. Fig. 5 is a side elevation of the flange curling mechanism. Fig. 6 is a detail section showing the can head as cut and formed by the dies of the press before being operated upon by the curling devices and Fig. 7 is a similar view of the can head after being operated upon by the curling devices.

In the drawing, A represents the frame of the machine, B the bed of a can head cutting and forming press, C the cross head or plunger thereof, D D$^1$ the can head cutting dies, D$^2$ D$^3$ the flange forming dies of the press, the cutting and forming dies having suitable provision $d$ $d^1$ for giving the flange $x$ of the can head X a slight preliminary start or curve $x^1$, this preliminary start or curve being necessary to enable the flange curling devices to coöperate with the cutting and forming dies in producing the finished or inward curl $x^2$ on the can head flange. The can head cutting and forming press may be of any well known or suitable construction, familiar to those skilled in the art and needs no special description. The provision $d$ $d^1$ on the flange cutting and forming dies for giving the preliminary start or curl $x^1$ to the can head flange may likewise be of any suitable construction adapted to perform this function, the same, however, preferably consisting of a bevel face or shoulder $d$ on the lower forming die $D^2$ and a coöperating bevel face or shoulder $d^1$ on the upper cutting die $D^1$.

C is the discharge chute of the can head cutting and forming press, the same being furnished with side guides $C^1$ $C^1$ between which the can heads pass, and an upper guide $C^2$ beneath which the can heads pass as they are discharged from the cutting and forming dies. The side guides $C^1$ of the discharge chute are cut out at $C^3$ to receive the flange curling devices which are arranged on each side of the can head discharge chute so that the can heads will pass between the curling devices as they pass down the chute. The flange curling devices on opposite sides of the can head chute both preferably have convex operating faces and are both preferably in the form of rotary disks $F$ $F^1$ or $F^2$ $F^3$. The upper pair of flange curling devices $F$ $F^1$ preferably have plain grooves or operating faces $f$ $f$. The lower or finishing pair of curling devices $F^2$ $F^3$ preferably have curved grooves or operating faces $f^1$ $f^1$. The two curling devices $F^1$ $F^3$ on one side of the discharge chute are preferably of larger diameter than the curling devices $F$ $F^2$ on the opposite side of the can head chute so that the peripheral speed of the former will be greater that than of the latter and thus cause the curling devices to have more or less of a slipping action on the can head being rotated between them. This facilitates the curling action and renders more efficient the operation of the curling devices. The shafts or spindles $f^2$ of the rotary curling devices are preferably furnished with pulleys $f^3$, and the same are preferably driven by a belt $f^4$ passing around said pulleys and around guide pulleys $f^5$ $f^6$ $f^7$ over a pulley $f^8$ on the driving shaft G of the can head cutting and forming press. The curling devices $F^1$ $F^3$ on one side of the discharge chute C are journaled on an adjustable slide H furnished with an adjusting screw $h$ for adjusting and regulating the pressure of the curling devices upon the can heads passing and rotating between them; and one of the curling devices on one side of the discharge chute is also mounted in adjustable bearings and provided with an independent adjusting screw $h^1$ to enable the lower pair of curling rollers or disks to be adjusted independently of the upper pair.

I claim:—

1. The combination with can head cutting and forming dies having provision for slightly curving or starting the curling of the flange of the can head, of flange curling devices peripherally engaging and rotating the can head and between which the can head passes as it is discharged from the dies, and means for delivering the can heads from said dies to said curling devices, substantially as specified.

2. The combination with can head cutting and forming dies having provision for starting the curling of the can head flange, of a discharge chute leading from said dies and flange curling devices peripherally engaging and rotating the can head as it passes along said chute, substantially as specified.

3. The combination with can head cutting and forming dies having provision for starting the curling of the can head flange, of a stationary discharge chute leading from said dies and flange curling devices on opposite sides of said chute said flange curling devices peripherally engaging and rotating the can heads as they pass along said chute, substantially as specified.

4. The combination with can head cutting and forming dies having provision for starting the curling of the can head flange, of a discharge chute leading from said dies and flange curling devices on opposite sides of said chute, both of said can head curling devices being rotary and having convex operating faces engaging the flange of the can head, substantially as specified.

5. The combination with can head cutting and forming dies having provision for starting the curling of the can head flange, of a discharge chute for the can heads and two pairs of flange curling devices, substantially as specified.

6. The combination with can head cutting and forming dies having provision for starting the curling of the can head flange, of a discharge chute for the can heads and two pairs of rotary flange curling devices, substantially as specified.

7. The combination with can head cutting and forming dies having provision for starting the curling of the can head flange, of a discharge chute for the can heads and two pairs of rotary flange curling devices, the lower or finishing pair having curved operating grooves or faces, substantially as specified.

8. The combination with can head cutting and forming dies having provision for starting the curling of the can head flange, of a discharge chute for the can heads and two pairs of rotary flange curling devices, the lower or finishing pair having curved operating grooves or faces and the upper pair having plain operating grooves or faces, substantially as specified.

9. The combination with can head cutting and forming dies having provision for starting the curve of the can head flange, of a can head discharge chute and a pair of rotary flange curling devices, the flange curling device on one side of the discharge chute being of larger diameter than the other, substantially as specified.

10. The combination with can head cutting and forming dies having provision for starting the curve of the can head flange, of a can head discharge chute and two pairs of rotary flange curling devices, the flange curling devices on one side of the discharge chute being of larger diameter than the other, substantially as specified.

11. The combination with a can head cutting and forming press having a discharge chute, of flange curling devices peripherally engaging and rotating the can heads passing along said chute, substantially as specified.

12. The combination with a can head cutting and forming press, of flange curling devices peripherally engaging and rotating the can heads as they are discharged by said press, substantially as specified.

13. The combination with a press having can head cutting and flange forming dies, of means peripherally engaging and rotating the can head for curling the flange of the can head, substantially as specified.

14. The combination with a press having can head cutting and flange forming dies, of means peripherally engaging and rotating the can head for curling the flange of the can head, and a chute for delivering the can heads from the dies to said flange curling means, substantially as specified.

15. The combination with a chute for the can heads, of rotary flange curling disks mounted on the stationary frame of the machine on opposite sides of the chute, substantially as specified.

16. The combination with a chute for the can heads, of rotary flange curling disks on opposite sides of the chute, one of said disks being of larger diameter than the other, substantially as specified.

17. The combination with a chute for the can heads, of two pairs of rotary flange curling disks mounted on the stationary frame of the machine, substantially as specified.

18. The combination with a chute for the can heads, of two pairs of rotary flange curling disks mounted on the stationary frame of the machine, the lower or finishing pair of said disks having curved grooves or operating faces, substantially as specified.

19. The combination with a chute for the can heads, of two pairs of rotary flange curling disks, the disks on one side of the chute being of larger diameter than those on the other, substantially as specified.

20. The combination with a chute for the can heads, of two pairs of rotary flange curling disks, the disks on one side of the chute being of larger diameter than those on the other, the upper pair of disks having plain grooves and the lower pair of disks having curved grooves for engagement with the can head flange, substantially as specified.

EDWIN V. SWANGREN.

Witnesses:
PEARL ABRAMS,
ESTHER ABRAMS.